United States Patent
Wisor

(10) Patent No.: US 7,219,219 B1
(45) Date of Patent: May 15, 2007

(54) HARDWARE INITIALIZATION METHOD THAT IS INDEPENDENT OF BOOT CODE ARCHITECTURE

(75) Inventor: Michael T. Wisor, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 547 days.

(21) Appl. No.: 10/756,551

(22) Filed: Jan. 13, 2004

(51) Int. Cl.
*G06F 15/177* (2006.01)

(52) U.S. Cl. ............... 713/1; 713/1; 713/2; 713/100

(58) Field of Classification Search ............. 713/1, 713/2, 100
See application file for complete search history.

(56) References Cited

U.S. PATENT DOCUMENTS 6,865,670 B2 * 3/2005 Yu et al. .................. 713/2
6,898,703 B1 * 5/2005 Ogami et al. ............ 713/2

OTHER PUBLICATIONS

"An Integrated Approach for Studying Architectural Evolution," Qiang Tu, et al., International Workshop on Program Comprehension, Paris, Jun. 2002, 12 pages.

"Designing Software for Ease of Extension and Contraction," David L. Parnas, IEEE, 1979, 10 pages.

* cited by examiner

*Primary Examiner*—Rehana Perveen
*Assistant Examiner*—Nitin C. Patel
(74) *Attorney, Agent, or Firm*—Lawrence J Merkel; Meyertons, Hood, Kivlin, Kowert & Goetzel, P.c.

(57) ABSTRACT

A first vendor generates one or more files corresponding to an integrated circuit having one or more registers. A content of the files is structured for at least one of: (i) incorporation into a boot code sequence; or (ii) access by the boot code sequence during execution. The boot code sequence is configured to initialize the registers responsive to the content during execution. The first vendor transmits the files to at least one of: (i) a second vendor that develops the boot code sequence; or (ii) a manufacturer of a system that includes the integrated circuit and the boot code sequence. A computer accessible medium comprises instructions which, when executed, generate the files described above and/or comprises the files. A method may include receiving, from the first vendor, the files described above. The content of the files is incorporated into the boot code sequence.

42 Claims, 15 Drawing Sheets

Chip Init File 88A

```
BIOS1:
    Early POST: ~_130A
        Early Post Code Segment ~_136A
    End Early POST: ~_130B Middle POST: ~_130C
        Middle Post Code Segment ~_136B
    End Middle POST: ~_130D Late POST: ~_130E
        Late Post Code Segment ~_136C
    End Late POST: ~_130F

BIOS2:
        ⋮
```

Fig. 11

HARDWARE INITIALIZATION METHOD THAT IS INDEPENDENT OF BOOT CODE ARCHITECTURE

BACKGROUND OF THE INVENTION

1. Field of the Invention

This invention is related to initializing registers in various integrated circuits in a system during a boot of the system.

2. Description of the Related Art

Generally, a computer system may include one or more processors, various integrated circuits, and other devices. When the computer system is powered on, the computer system is reset, thus providing an initial state of the computer system. Then, a boot code sequence is executed on a processor of the computer system to determine the resources of the computer system (e.g. memory, disk drives, keyboard, mouse, etc.), perform various checks on the resources, and enable the resources in the computer system so that operating system software can be loaded from disk and executed. The boot code sequence may also create various data structures to be used by the operating system software. The boot code sequence is typically stored in a nonvolatile memory (e.g. a read only memory (ROM) or a flash memory), so that the code can be fetched by the processor and executed before most computer system resources are enabled for use. In personal computer (PC) systems, the boot code sequence is referred to as Basic Input/Output System (BIOS) code. As used herein, a boot code sequence may include any code executed in response to powering on a computer system, to initialize the computer system for executing the operating system (and any desired application programs). The boot code sequence may also be executed in response to resets of the computer system (e.g. warm resets that may occur after the power-on, or cold, reset occurs).

Boot code, such as BIOS code, may include power on self test (POST) code, which may test various resources in the computer system and may initialize the various resources for use. In particular, the computer system may include various integrated circuits (e.g. processors, chipset components such as the north bridge and south bridge components, etc.). Each integrated circuit may require initialization, including writing initial values into various registers in the integrated circuits. The POST code may perform these initializations.

Typically, the integrated circuits included in a given system are developed by one or more integrated circuit vendors. The boot code sequence (e.g. BIOS code) for the given system is developed by a BIOS vendor. There are several BIOS vendors (e.g. Phoenix, Award, and American Megatrends, Inc. (AMI) are the most typical ones). Furthermore, various OEMs may modify the BIOS code from one of the BIOS vendors. Some OEMs (e.g. International Business Machines (IBM)) develop their own custom BIOS code. Other OEMs (e.g. Hewlett-Packard (HP)) may develop their own custom BIOS code for some systems (e.g. high end servers) while using BIOS code from one of the typical BIOS vendors for other systems. Accordingly, the integrated circuit vendors typically provide documentation of the registers in the integrated circuit, and the values to which the registers are to be initialized by the BIOS code. At an early point in the development process, the integrated circuit vendors may provide the documentation to the BIOS vendors to permit concurrent development of the BIOS code.

During the ensuing development of the integrated circuits, there may be multiple revisions of the integrated circuit before the integrated circuit reaches production quality. During the development, the registers that are included in a given integrated circuit may change, the definitions of the contents may change, and the required POST initialization values may change. Frequent updates are supplied to the BIOS vendors in the form of updated documentation, and the updates may also have to be supplied to OEMs as well (if the BIOS vendor has already released BIOS code to OEMs for their customizations).

A prior art POST code sequence for PC systems is illustrated via the flowchart shown in FIG. 1. That is, the flowchart of FIG. 1 may represent one or more instructions which, when executed, perform the functions shown in FIG. 1. FIG. 1 is a high level flowchart of the POST code. The POST code has three phases: early POST (block 10), middle POST (block 12), and late POST (block 14). As used herein, a "phase" is a portion of code in which various defined operations are performed. Various phases may be performed in a defined order. For example, the early POST phase precedes the middle POST phase, which precedes the late POST phase. Each phase is shown in more detail in FIGS. 2-4. That is, the flowcharts of FIGS. 2-4 may each represent one or more instructions in each phase which, when executed, perform the functions shown in FIGS. 2-4, respectively.

FIG. 2 illustrates the early POST phase 10. In the early POST phase 10, the central processing unit (CPU) built-in self-test (BIST) is performed (block 20). An original equipment manufacturer (OEM) hook is then provided (block 22), to permit an OEM to insert custom code for the OEM's system (e.g. to handle the BIST result from the CPU). Generally, a hook is a software mechanism to provide for software expansion. The hook may be implemented in multiple ways. For example, a label may be provided in the code at which the custom code is inserted during compile of the code (e.g. compile of assembly mnemonics to binary code, if the boot code sequence is written in assembly, or compile of higher level language code). Alternatively, the boot code may examine a variable to determine what to do at the hook (e.g. the variable may be the address of the beginning of the custom code). In yet another alternative, the hook may be a call (e.g. a branch) to a predefined address at which the custom code may be located. The variable or predefined address mechanisms may permit the custom code to be used without recompiling the boot code sequence.

The early POST phase 10 checks the BIST result to determine if an error has occurred (decision block 24). If an error is detected (decision block 24—"no" leg), the early POST phase 10 records the error (e.g. in a nonvolatile memory such as the complementary metal-oxide-semiconductor (CMOS) random access memory (RAM) included in PC systems) (block 26) and the computer system may power down (block 28). If no error is detected (decision block 24—"yes" leg), the early POST phase provides another OEM hook (block 30). The early POST phase 10 continues with code to implement any workarounds or bug patches that may be required for the integrated circuits and other devices in the system (block 32). The early POST register initializations are then performed (block 34). That is, block 34 represents the code that initializes the registers in the various integrated circuits to the values required for normal operation of the integrated circuits (for those initializations performed in the early POST phase 10). The initializations performed in the block 34 are generated by the BIOS vendor, via human interpretation of the specification information provided by the integrated circuit vendor(s). The early POST phase 10 then performs memory configuration and test on the memory system in the computer system (block 36). If the memory test indicates that the memory is functioning normally (decision block 38—"yes" leg), the memory system is enabled and the early POST phase 10 is complete. On the other hand, if the memory test indicates that the memory is not functioning normally (decision block 38—"no" leg), the early POST phase 10 powers down the computer system (block 40). The reason for power down may be recorded (e.g. in CMOS RAM).

FIG. 3 illustrates the middle POST phase 12. The remainder of the BIOS code may be stored in a nonvolatile memory in compressed form. The middle POST phase 12 decompresses the BIOS (block 42). For example, the decompressed BIOS may be stored in the memory system, since the memory system was enabled in the early POST phase 10. The middle POST phase 12 enables any caches in the system (e.g. caches in the processors, external caches, etc.) and establishes the stack in memory (block 44). The keyboard, mouse, and video devices coupled to the computer system are enabled (block 46). Additionally, PC systems typically include the Peripheral Component Interconnect (PCI) for interfacing to various input/output (I/O) devices. The middle POST phase 12 enumerates the PCI devices, per the PCI specification (block 50). Middle POST register initializations are then performed (block 52). That is, block 52 represents the code that initializes the registers in the various integrated circuits to the values required for normal operation of the integrated circuits (for those initializations performed in the middle POST phase 12). The initializations performed in the block 52 are generated by the BIOS vendor, via human interpretation of the specification information provided by the integrated circuit vendor(s). Another OEM hook is provided (block 54), and the middle POST phase 12 is complete.

FIG. 4 illustrates the late POST phase 14. The computer system may include various setup options specific to the particular system. The late POST phase 14 reads the setup options (block 56). Late POST register initializations are then performed (block 58). That is, block 58 represents the code that initializes the registers in the various integrated circuits to the values required for normal operation of the integrated circuits (for those initializations performed in the late POST phase 14). The initializations in block 58 may include custom initializations indicated by the setup options. The initializations performed in the block 34 are generated by the BIOS vendor, via human interpretation of the specification information provided by the integrated circuit vendor(s). Another OEM hook is provided (block 60), and the late POST phase 14 is complete.

Typically, most of the register initializations for the integrated circuits in the computer system are performed in the early POST phase 10. Some initializations occur in the middle and late POST phases 12 and 14 as well. Additionally, in some cases, system-specific initializations may be performed in the middle and late POST phases 12 and 14. Generally, one of two methods are used for the register initializations: a hard-coded method and a table-driven method. Each method is described briefly below.

In the hard-coded method, the address of the register and/or the value to be written into the register is hard-coded into the code sequence. If the boot code sequence is compiled, the address and/or value may be represented by labels which are assigned a value in the source file. This method is often used for workarounds and bug fixes (e.g. block 32 in FIG. 2). Updating the hard-coded initializations is difficult and time consuming, as each line of code that performs register initializations must be located, examined, and updated by a human.

In the table-driven method, a data table is provided for each integrated circuit in the boot code sequence. Each entry in the table defines a register and the value to be programmed into the register. Typically, the value includes a mask (defining which bits of the register to update) and a data value. The current value of the register may be read and masked. The data value may be logically ORed into the masked current value, and the result written back to the register. The boot code sequence includes a routine (e.g. a loop) that reads each entry in the table and performs the initialization until the end of the table is reached. Updating the table-driven initializations may be simpler, since the data tables are a central location for possible updates. Unfortunately, various BIOS vendors (see below) use different formats for the data tables.

An algorithmic method is sometimes used during hardware initialization as well. Typically, the algorithmic method is used to perform a more complex task such as the memory test and configuration or the PCI enumeration. This method is often dependent not just on the integrated circuits included in the system, but also on the system configuration as a whole.

As mentioned above, there may be frequent updates to the initialization requirements for a given integrated circuit. Unfortunately, the updated initialization requirements are often not implemented properly. The frequency of updated information may be a source of error, since a BIOS vendor may fail to implement one of many updates. Furthermore, the updates are generally performed by humans interpreting the specification documents, checking the BIOS code for the locations that require change to implement the updates. Human error in locating all the locations, or in properly implementing the changes, is another source of error. Each of the various BIOS vendors implement a different software architecture for implementing the POST code described above, and differences in architecture may affect the proper implementation of updates. That is, updates may be performed in different fashions dependent on the architecture of the BIOS code. Furthermore, the number of independent updaters may be a source of error (e.g. each BIOS vendor must make updates, and some OEMs may have to make updates as well). While some updaters may make the updates properly, others may not.

SUMMARY OF THE INVENTION

In one embodiment, a method is contemplated. A first vendor generates one or more files corresponding to an integrated circuit having one or more registers. A content of the one or more files is structured for at least one of: (i) incorporation into a boot code sequence; or (ii) access by the boot code sequence during execution. The boot code sequence is configured to initialize the one or more registers responsive to the content during execution. The first vendor transmits the one or more files to at least one of: (i) a second vendor that develops the boot code sequence; or (ii) a manufacturer of a system that includes the integrated circuit and the boot code sequence. A computer accessible medium is also contemplated, in other embodiments, that comprises one or more instructions which, when executed generate the one or more files described above. Still further, an embodiment of a computer accessible medium comprising the one or more files described above is contemplated. In other embodiments, a method may include receiving, from the first vendor, the one or more files described above. The content of the one or more files is incorporated into the boot code sequence.

In yet other embodiments, a system may include one or more integrated circuits, at least one of which comprises a processor, and one or more nonvolatile memories. The nonvolatile memories store: (i) a boot code sequence executable by the processor and (ii) one or more files corresponding to at least a first integrated circuit of the one or more integrated circuits, wherein the first integrated circuit has one or more registers. The content of the one or more files is structured for access by the boot code sequence during execution. The boot code sequence is configured to initialize the one or more registers responsive to the content.

BRIEF DESCRIPTION OF THE DRAWINGS

The following detailed description makes reference to the accompanying drawings, which are now briefly described.

FIG. 11 is a block diagram of a second embodiment of a chip init file.

Figure 1:
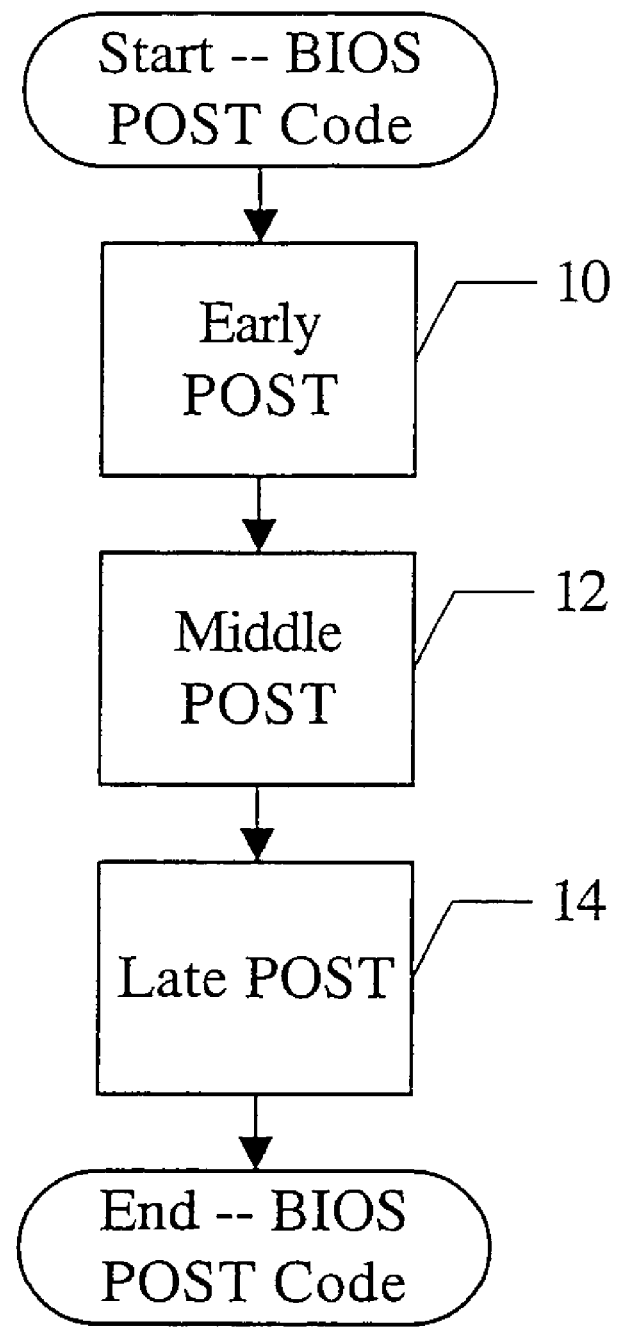
FIG. 1 is a flowchart of a portion of a prior art boot code sequence.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

A method for implementing updates to register initializations corresponding to integrated circuits is described. Generally, the method may include each integrated circuit vendor (more briefly, "chip" vendor) generating one or more files containing the register initializations to be performed (including recent updates, as well as those initializations that have not changed). The content of the file is structured for: (i) incorporation into the boot code sequence; (ii) access by the boot code sequence during execution; or (iii) both. For example, a file may include one or more code sequences for incorporation into the boot code sequence. The code sequences may be in source code form, such as assembly language mnemonics or higher level languages, or may be in binary form. A file may include one or more data tables defining the register initializations, which may be accessed by the boot code sequence during execution. The data tables may be incorporated into the boot code sequence (to be referenced by nearby code), or may be stored in a nonvolatile memory in the system for access during execution. A file may also include both of the above mechanisms for delivering register initializations. The chip vendor may transmit the file(s) to the boot code sequence vendor(s) and/or the OEMs of the systems that implement the chip.

The boot code sequence vendors (and/or OEMs) may receive the files from the integrated circuit vendors and may include the files in the boot code sequence or with the boot code sequence. If one or more files were previously received from a given integrated circuit vendor, the boot code sequence vendor/OEM may replace the previous files with the newly delivered files.

In some embodiments, the above method may reduce the opportunity for human error. When an update is required for an integrated circuit, the update is implemented by the integrated circuit vendor and distributed for inclusion in the boot code sequences. The inclusion of the new files may be relatively simple, and thus less prone to error. Furthermore, the frequency of updates may be less of an issue in some embodiments. As long as the most recent update is included, all previous updates may be properly implemented.

As used herein, an "integrated circuit" includes any circuitry implemented on a single semiconductor substrate (e.g. silicon, gallium arsenide, or any other semiconductor substrate). An "integrated circuit vendor" may include any entity (e.g. individual, company, group of companies and/or individuals, etc.) which designs an integrated circuit. The integrated circuit vendor may, in some cases, also manufacture the integrated circuit. Alternatively, the integrated circuit vendor may contract with another vendor for manufacturing the integrated circuit. The term "chip" may be used to more briefly refer to integrated circuit, and the term "chip vendor" may be used more briefly to refer to "integrated circuit vendor". It is intended that chip be interpreted in the same manner as integrated circuit, and that chip vendor be interpreted in the same manner as integrated circuit vendor.

The discussion below may refer to BIOS code as one example of a boot code sequence. However, any boot code sequence may implement the method for providing updates to chip register initializations. It is intended that the following description apply to any boot code sequence in any system. A "boot code sequence vendor" may include any entity which develops a boot code sequence for a system (e.g. a BIOS vendor may develop BIOS code). Additionally, the file(s) provided by a chip vendor including the register initializations are referred to as chip init file(s). For convenience in the description, a single chip init file may be referred to. However, it is understood that the chip init file may actually be two or more files, as desired, in various embodiments.

Figure 5:
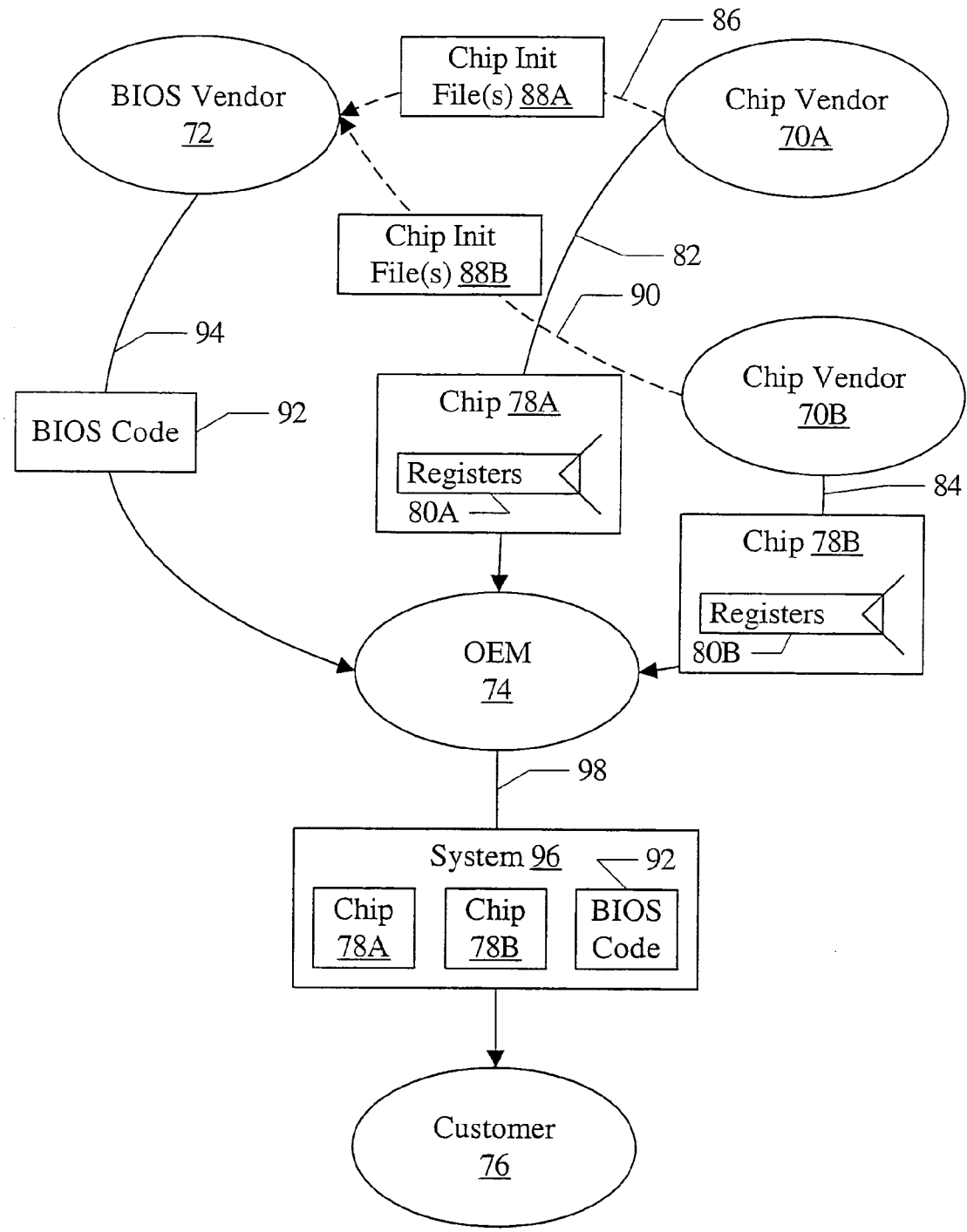
FIG. 5 is a block diagram of a BIOS vendor, chip vendors, an original equipment manufacturer (OEM), and items transferred therebetween according to one embodiment.

Turning now to FIG. 5, a block diagram of a BIOS vendor, chip vendors, an original equipment manufacturer (OEM), and items transferred therebetween according to one embodiment is shown. Illustrated in FIG. 5 are chip vendors 70A and 70B, BIOS vendor 72, OEM 74, and customer 76. Chip vendor 70A designs a chip 78A having one or more registers 80A, and supplies the chip 78A to the OEM 74 (solid arrow 82). Similarly, chip vendor 70B designs a chip 78B having one or more registers 80B, and supplies the chip 78B to the OEM 74 (solid arrow 84). Additionally, each of the chip vendors 70A-70B supplies corresponding chip init files 88A-88B containing the register initializations to be performed (dotted arrows 86 and 90). As mentioned above, the content of the chip init files 88A-88B is structured for incorporation into the boot code sequence, access by the boot code sequence during execution, or both. The BIOS vendor 72 develops the BIOS code 92, and supplies the BIOS code 92 (including the initializations specified by the chip init files 88A-88B) to the OEM 74 (solid arrow 94). The OEM 74 manufactures a system 96 including the chips 78A-78B and the BIOS code 92, and supplies the system to the customer 76 (solid arrow 98). The BIOS code 92 in the system 96 may include additional custom code via the OEM hooks described previously.

A chip vendor 70A-70B may supply the chip init file(s) 88A-88B to the BIOS vendor 72 at a point early in the design of the chip 78A-78B (e.g. a point at which the design is reasonably stable), and may subsequently re-supply the chip init file(s) 88A-88B if any updates are made to the registers or their initialization requirements. The files may be transmitted in any desired fashion. For example, the files may be transmitted electronically over a network (e.g. the Internet, a wide area network, a local area network, a wireless network, etc.). Alternatively, the files may be encoded on a computer accessible medium such as a disk, a compact disk (CD), a digital video disk (DVD), etc. and may be physically transmitted.

While not shown in FIG. 5, the chip vendors 70A-70B may also supply the chip init file(s) 88A-88B to the OEM 74 (and other OEMs, not shown in FIG. 5, if applicable). If the OEM 74 has already taken delivery of the BIOS code 92 for adding its own customizations, the OEM 74 may incorporate the chip init file(s) 88A-88B. Alternatively, in some embodiments, the chip init file(s) 88A-88B may be stored in a nonvolatile memory in the system 96 and may be accessed by the BIOS code 92 during execution on the system 96 (e.g. read by the BIOS code 92, if the chip init file(s) 88A-88B include data; fetched in response to a call by the BIOS code 92, if the chip init file(s) 88A-88B include instruction code; or both). Embodiments which access the chip init file(s) during execution may permit ease of upgrade to a system 96 in the field, as well, since new chip init file(s) 88A-88B may be stored into the nonvolatile memory in place of the previous chip init file(s) 88A-88B. Such an upgrade may permit workaround code to be supplied to the system 96 in the field, in some embodiments. Furthermore, such an upgrade may permit an upgrade of the corresponding chip 78A-78B in the system 96 by permitting the corresponding register initializations to be updated, in some embodiments.

It is noted that the system 96 may include more than one instantiation of a given chip 78A-78B. Any number of chips, from any number of chip vendors 70A-70B, may be included. For example, chips 78A-78B may include processors, "chipsets" (e.g. north bridge and/or south bridge chips), etc. Furthermore, while one BIOS vendor 72 is shown in FIG. 1, there may be multiple BIOS vendors, as mentioned above. For any given system 96, the OEM 74 may select a BIOS vendor.

It is noted that, while FIG. 5 illustrates the chip vendors 70A-70B providing the chips 78A-78B to the OEM 74 for inclusion in the system 96, in other cases a chip 78A-78B may be included in a device including other components, and the device may be provided to the OEM 74. For example, the chip vendor 70A-70B may provide the chip 78A-78B to the device vendor, which may include the chip 78A-78B in a device provided to the OEM. Alternatively, the device vendor may design the chip (e.g. the device vendor may be a chip vendor as well), and may include the chip in the device.

It is noted that the system 96 may typically include a nonvolatile memory for storing the BIOS code 92. If the chip init file(s) 88A-88B are also stored, they may be stored in the same nonvolatile memory as the BIOS code 92 or a different nonvolatile memory, as desired. Generally, a nonvolatile memory may include any memory which retains its state when the power to the system 96 is turned off (i.e. is not supplying voltage to the circuitry in the system 96). The CMOS RAM in a PC system may be an example of a nonvolatile memory. The CMOS RAM is a RAM which is powered by a battery, and thus the RAM may remain powered when the power to system 96 is turned off. A fixed ROM, or may be any of a variety of programmable ROMs (PROMs) may be other examples of nonvolatile memory. PROMs may include flash memory, erasable PROMs (EPROMs), electrically erasable PROMs (EEPROMs), etc.

Figure 6:
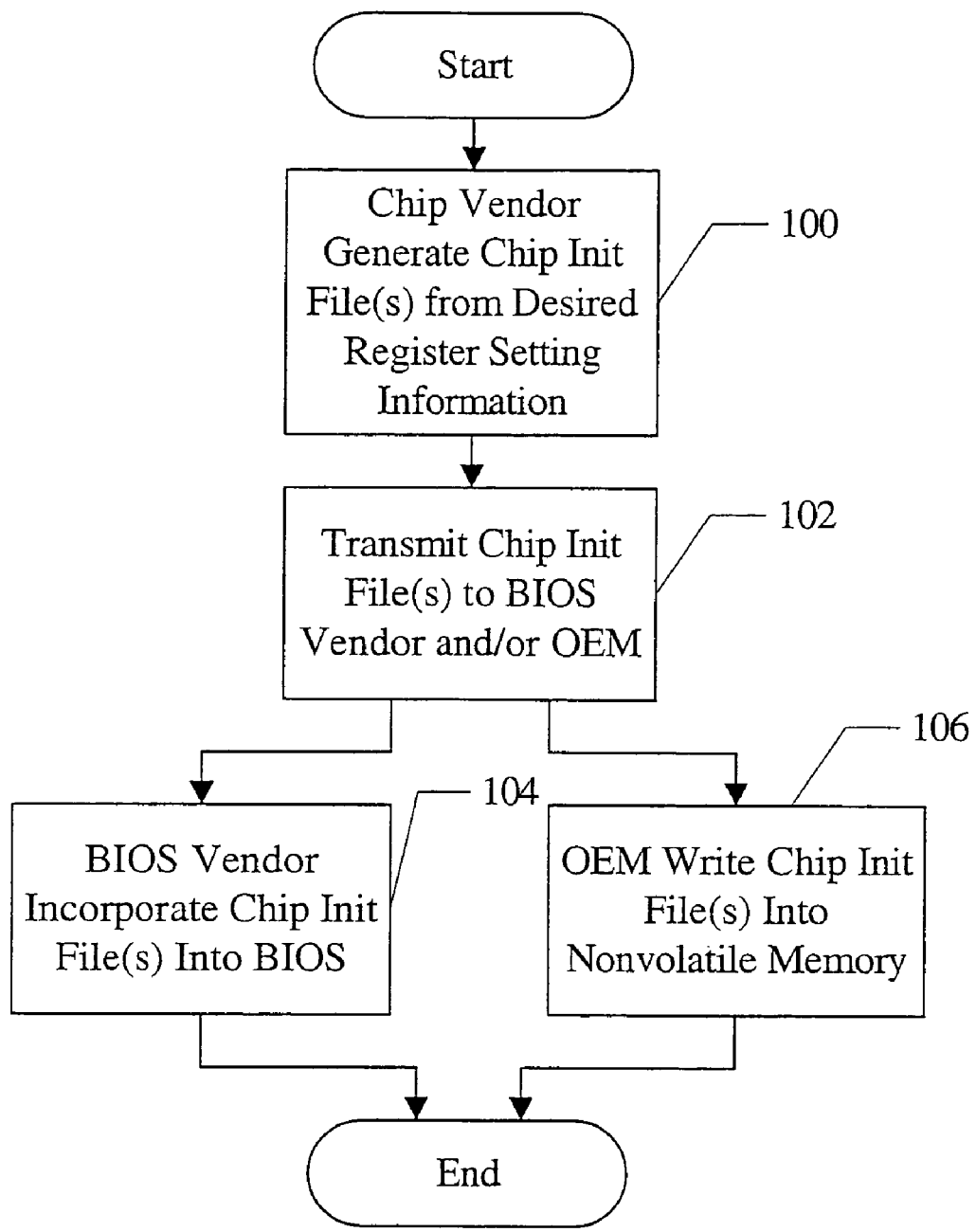
FIG. 6 is a flowchart illustrating one embodiment of a method for a chip vendor to provide initialization information to a BIOS vendor and/or an OEM for use.

Turning next to FIG. 6, a flowchart is shown illustrating one embodiment of a method for a chip vendor 70A-70B to provide initialization information (chip init files 88A-88B) to a BIOS vendor and/or an OEM for use. The flowchart may be repeated each time updated initialization information is to be provided. In some embodiments, portions of the flowchart of FIG. 6 may be implemented in software executed on a computer system at the chip vendor 70A-70B. The blocks corresponding to such portions may represent one or more instructions in the software which, when executed, perform the operation(s) specified for those blocks.

The chip vendor 70A-70B generates one or more chip init file(s) from desired register setting information (block 100). The desired register setting information may be provided in any fashion. For example, an embodiment described below with regard to FIGS. 13 and 14 employs a database storing the register definitions for a chip as well as the initialization values for the registers. Chip init generation code may be written that, when executed, parses the database to extract the register definitions and initialization values. Alternatively, a specification document (stored electronically) may include the information. Chip init generation code may be written that, when executed, parses the specification document. The specification document may employ a particular format to ease the parsing operation. Alternatively, markup language may be used to identify register definitions and initialization values in the document (e.g. hypertext markup language (HTML), standard generalized markup language (SGML), extensible markup language (XML), or any other markup language may be used). In yet another alternative, a source of register setting information may be manually created or the chip init file(s) 88A-88B may be manually created.

In some embodiments, the register setting information may further indicate one or more temporal requirements for register initialization. Generally, a "temporal requirement" may define a time at which a given register is to be initialized. In some cases, the temporal requirement may indicate in which POST phase the initialization is to be performed (early, middle, or late). In other cases, the temporal requirement may be relative to another initialization (e.g. before or after another register, before one register and after another register, etc.). If temporal requirements are included, block 100 may further including ordering the initializations in the chip init file(s) 88A-88B to accomplish the temporal requirements.

The chip vendor 70A-70B transmits the chip init files 88A-88B to the BIOS vendors (e.g. BIOS vendor 72) and/or the OEMs (e.g. OEM 74) (block 102). As mentioned above, any means of transmission may be used (e.g. physical, electronic, etc.). A BIOS vendor 72 receiving the chip init file(s) 88A-88B may incorporate the chip init files into the BIOS code 92 (block 104). An OEM 74 receiving the chip init file(s) 88A-88B may similarly incorporate the chip init file(s) 88A-88B. Alternatively, in some embodiments, an OEM 74 receiving the chip init file(s) 88A-88B may write the chip init file(s) 88A-88B to a nonvolatile memory in the system 96 (block 106). Block 104 may be used if the BIOS code 92 incorporates the chip init file(s) 88A-88B, and block 106 may be used if the chip init file(s) 88A-88B are accessed during execution by the BIOS code 92.

Figure 2:
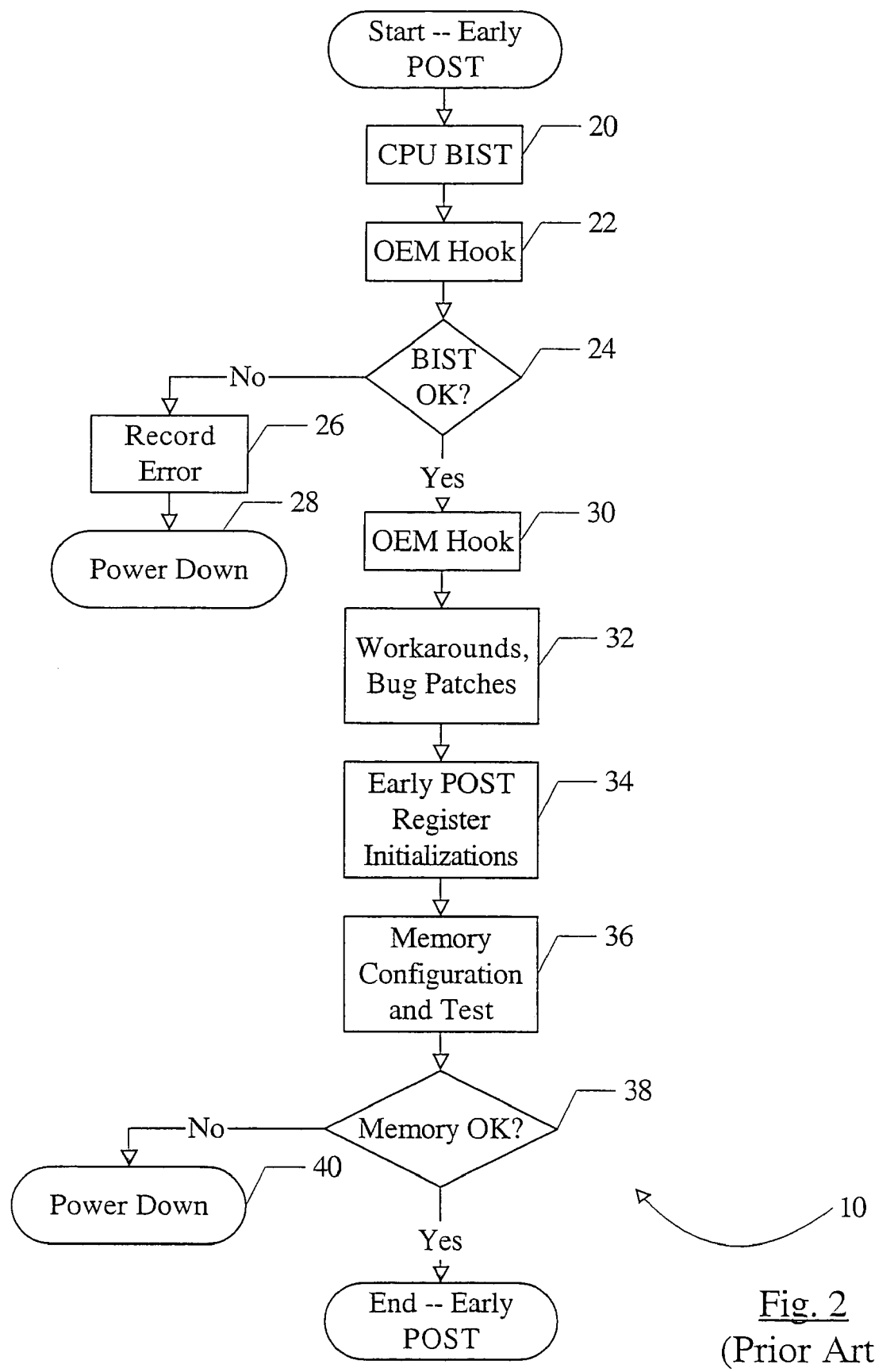
FIG. 2 is a flowchart of an early POST phase of the prior art boot code sequence shown in FIG. 1.
Figure 7:
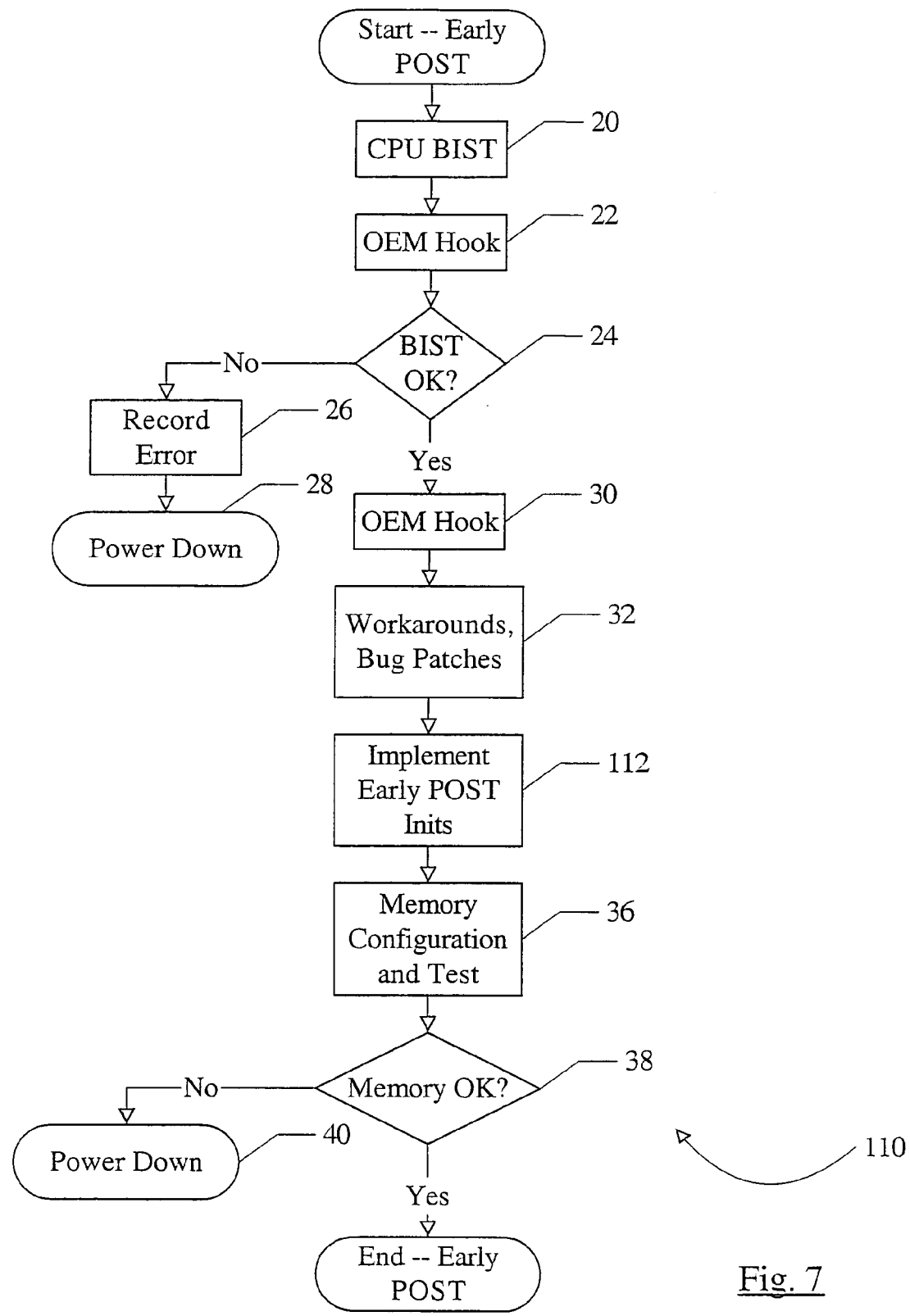
FIG. 7 is a flowchart of one embodiment of an early POST phase of a boot code sequence.

Turning next to FIG. 7, a flowchart is shown of one embodiment of an early POST phase 110 of a boot code sequence. Other embodiments may eliminate various operations in the embodiment FIG. 7, reorder operations, or add operations as desired. In the illustrated embodiment, the early POST phase 110 includes the blocks 20, 22, 24, 26, 28, 30, 32, 36, 38, and 40 similar to the like numbered blocks of FIG. 2. Additionally, the early POST phase 110 includes implementing the early POST register initializations indicated in the chip init files 88A-88B (block 112).

The operation that occurs at block 112 may vary from embodiment to embodiment, dependent on the content of the chip init files 88A-88B and whether or not the chip init files 88A-88B are incorporated into the BIOS code 92 or are accessed by the BIOS code 92 during execution. For example, if the chip init files 88A-88B contain data tables, a data table for the early POST phase 110 may be incorporated at block 112. Block 112 may further represent instructions which, when executed, read the data table entries and write the identified registers with the specified values. Alternatively, this code may be included in the chip init files 88A-88B. If the chip init files 88A-88B include code to perform the initialization, the block 112 may represent a hook for the early POST portion of the chip init files 88A-88B. If the chip init files 88A-88B include both data tables and code (e.g. for special case initializations), the block 112 may represent the code to read the data table entries and write the specified registers as well as a hook for the code in the chip init files 88A-88B. In yet another alternative, if the chip init files are written to a reserved address in a nonvolatile memory and include code to initialize the registers, the block 112 may represent a call (e.g. a branch) to the early POST portion of the chip init files 88A-88B. If the chip init files are written to a reserved address in a nonvolatile memory and include data tables, the block 112 may represent instructions to read the table entries beginning at the reserved address.

It is noted that, while the early POST phase 110 in FIG. 7 includes code to implement workarounds and bug patches (block 32), in other embodiments this block may be eliminated (at least with regard to workarounds and bug patches for the chips 78A-78B). Instead, bug patches and workarounds for the chips 78A-78B may be implemented as part of block 112.

Figure 3:
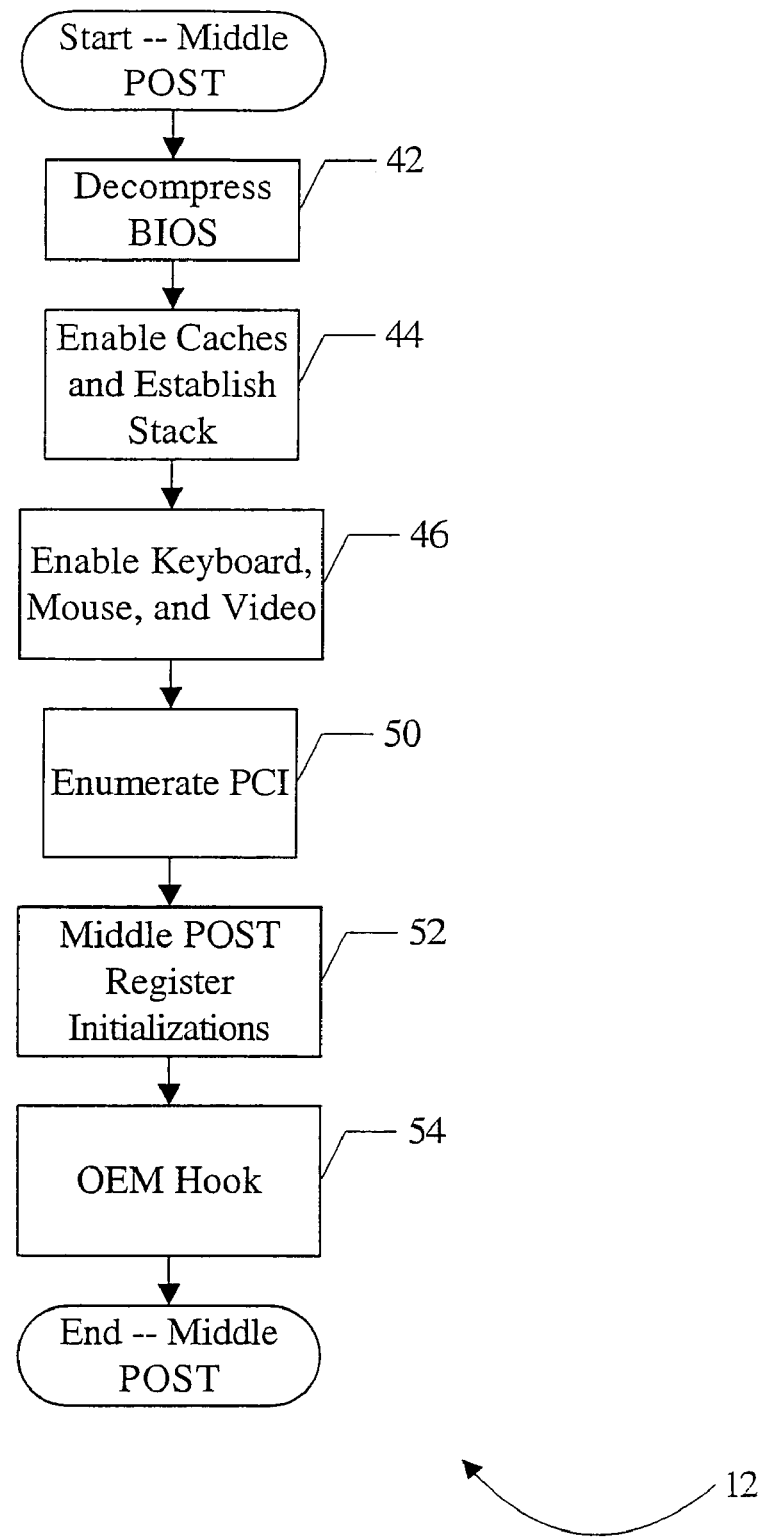
FIG. 3 is a flowchart of a middle POST phase of the prior art boot code sequence shown in FIG. 1.
Figure 8:
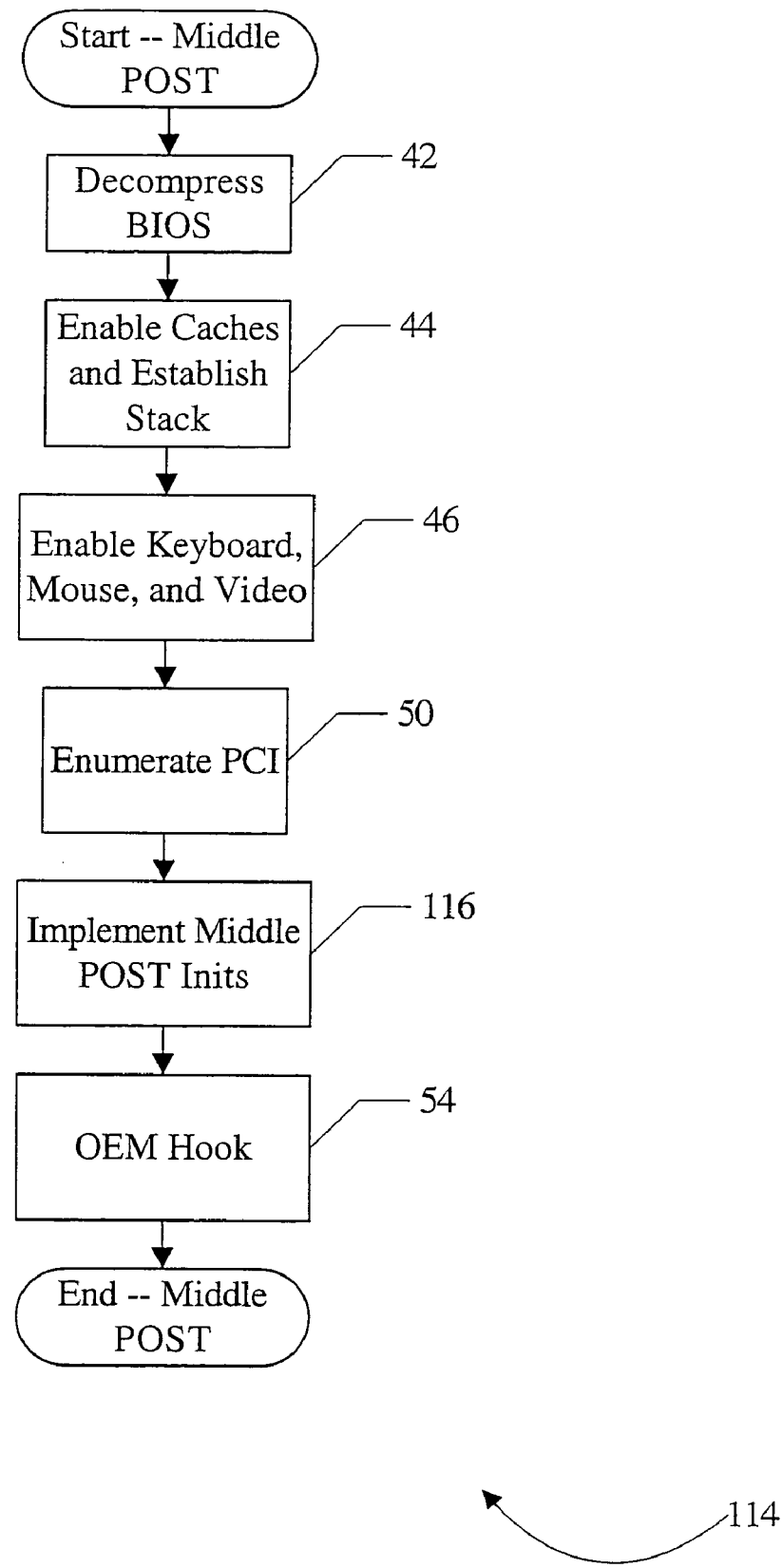
FIG. 8 is a flowchart of one embodiment of a middle POST phase of a boot code sequence.

FIG. 8 is a flowchart of one embodiment of a middle POST phase 114 of a boot code sequence. Other embodiments may eliminate various operations in the embodiment FIG. 8, reorder operations, or add operations as desired. In the illustrated embodiment, the middle POST phase 114 includes the blocks 42, 44, 46, 50, and 54 similar to the like numbered blocks of FIG. 3. Additionally, the middle POST phase 116 includes implementing the middle POST register initializations indicated in the chip init files 88A-88B (block 116). Similar to block 112 above, the operation of the block 116 may vary from embodiment to embodiment depending on the content of the chip init files 88A-88B and whether they are incorporated into the BIOS code 92 or are accessed during execution by the BIOS code 92. The operation may be similar to the discussion of block 112, except that the middle POST portion of the chip init files 88A-88B may be referenced.

Figure 4:
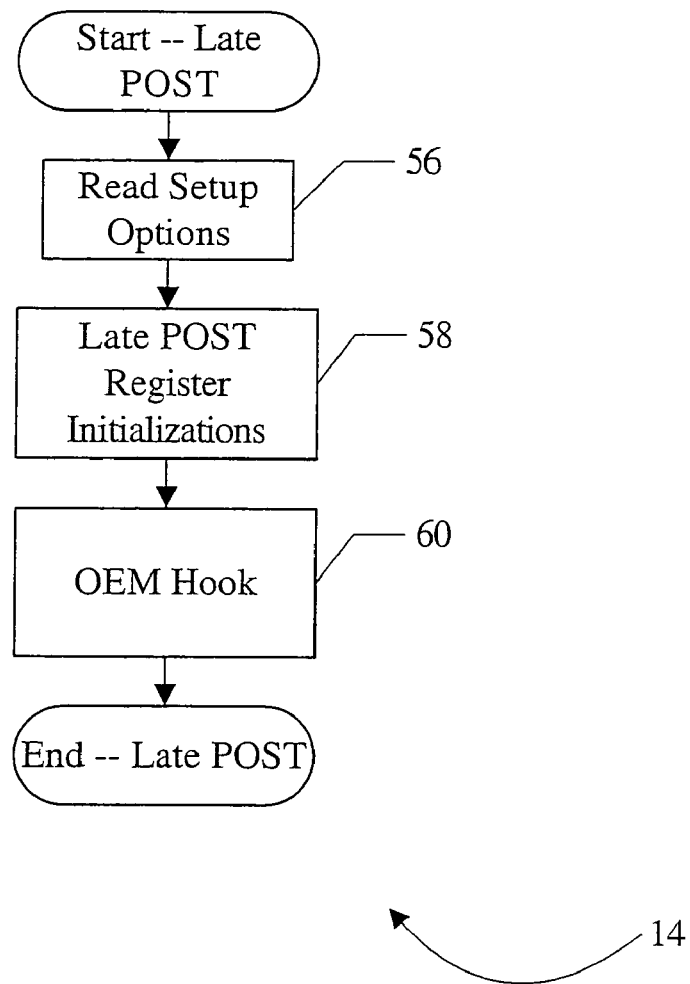
FIG. 4 is a flowchart of a late POST phase of the prior art boot code sequence shown in FIG. 1.
Figure 9:
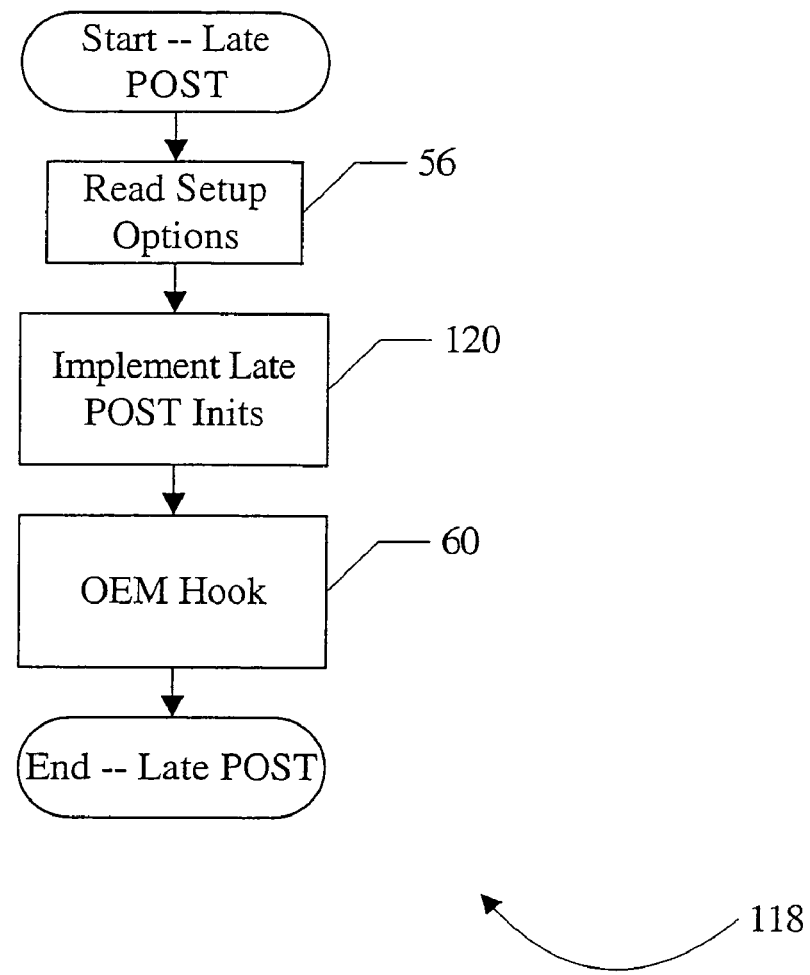
FIG. 9 is a flowchart of one embodiment of a late POST phase of a boot code sequence.

FIG. 9 is a flowchart of one embodiment of a late POST phase 118 of a boot code sequence. Other embodiments may eliminate various operations in the embodiment FIG. 9, reorder operations, or add operations as desired. In the illustrated embodiment, the late POST phase 118 includes the blocks 56 and 60 similar to the like numbered blocks of FIG. 4. Additionally, the late POST phase 118 includes implementing the late POST register initializations indicated in the chip init files 88A-88B (block 120). Similar to block 112 above, the operation of the block 120 may vary from embodiment to embodiment depending on the content of the chip init files 88A-88B and whether they are incorporated into the BIOS code 92 or are accessed during execution by the BIOS code 92. The operation may be similar to the discussion of block 120, except that the late POST portion of the chip init files 88A-88B may be referenced.

The embodiments illustrated in FIGS. 7-9 provide for chip register initializations in each of the POST phases 110, 114, and 118. Other embodiments may only perform chip register initializations in one phase. If only one phase performs chip register initializations, the chip init files 88A-88B may include only one section for that phase. Still further, other embodiments may perform chip register initializations in only some of the phases, and the chip init files 88A-88B may include sections for each phase in which chip register initialization is performed.

Figure 10:
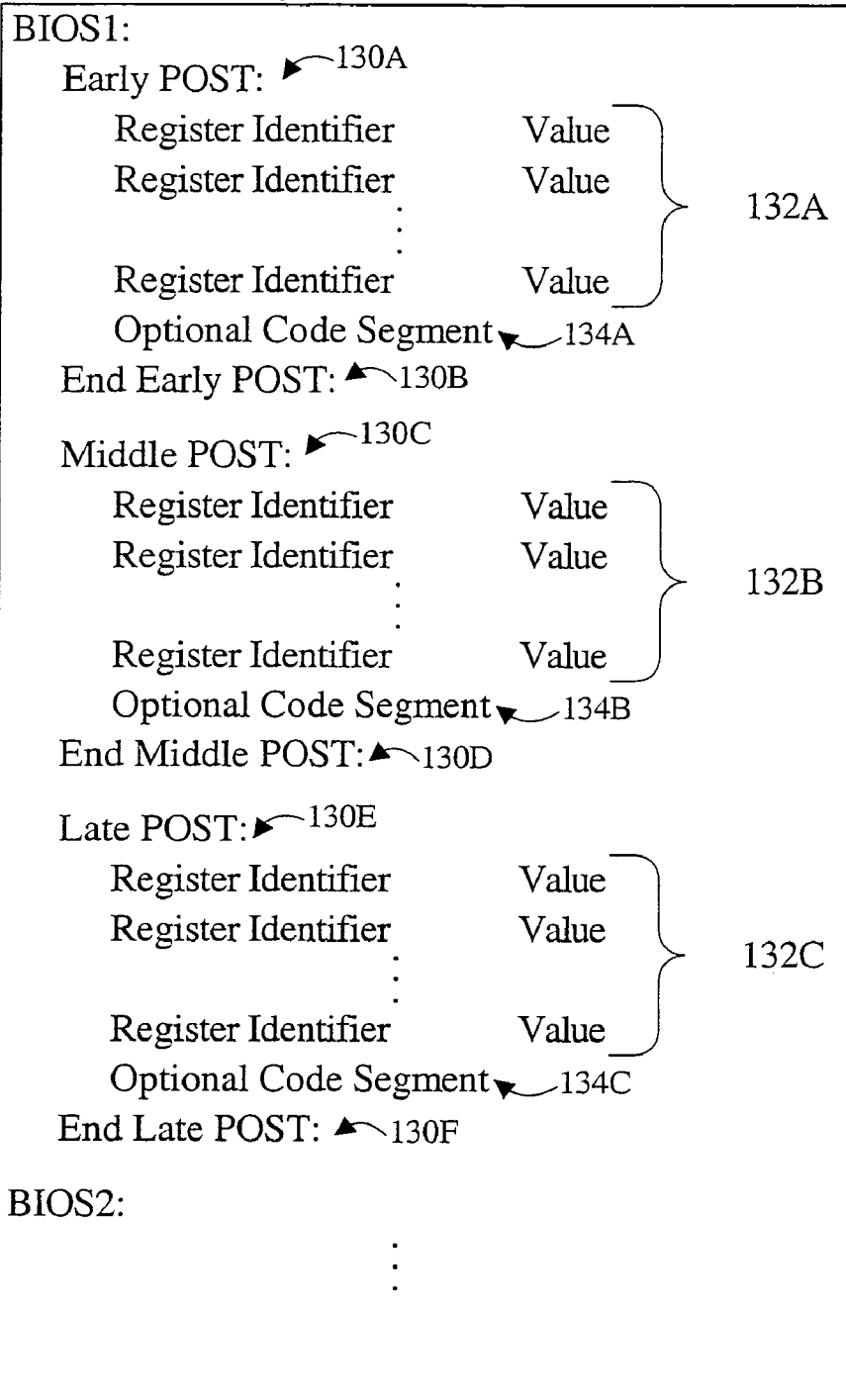
FIG. 10 is a block diagram of a first embodiment of a chip initialization (init) file.

FIG. 10 is a block diagram of a first embodiment of a chip init file 88A. The chip init file 88B may be similar. In the embodiment of FIG. 10, the chip init file 88A includes a section for each POST phase. The sections may be delimited by labels. For example, the labels 130A and 130B may delimit the portion for the early POST phase 110. Similarly, the labels 130C-130D may delimit the portion for the middle POST phase 114 and the labels 130E-130F may delimit the portion for the late POST phase 118. Generally, a label may be a source code data construct which may be used to identify a location in the source code (or data embedded with the source code, in this case). The source code may use the labels as symbolic addresses. When the source code is compiled, the label is translated to the address assigned to the location of the label. Thus, the embodiment of FIG. 10 may be used if the chip init file 88A is to be incorporated into the BIOS code 92.

In the illustrated embodiment, the chip init file 88A includes a data table for each POST phase. For example, a data table 132A may identify register initializations for the early POST phase 110. Similarly, a data table 132B may identify register initializations for the middle POST phase 114 and a data table 132C may identify register initializations for the late POST phase 118. Each entry in the data table includes a register identifier and a value. As used herein, a "register identifier" includes any data which may be used, in an instruction or instructions executed on the system 96, to access a register. For example, a register identifier may include an address. Alternatively, the register identifier may include an offset from a known base address (e.g. a base address for the chip including the register, or a base address for a block within the chip that includes the register, as discussed below). In another alternative, the register identifier may include PCI-style identification (e.g. bus number, device number, function number, and ID). For a processor chip, the register identifier may include a special register address (e.g., in x86 processors, an address in model specific register (MSR) space).

The value in each data table entry may comprise the initialization value to be written to the identified register. In some embodiments, the value may include the initialization value and a mask indicating which portions of the current register value are to be modified with the initialization value and which are to remain unchanged.

Code in the corresponding phase 110, 114, or 118 may read each entry in the respective data table 132A-132C, and may write the identified register with the specified value. Alternatively, the code to read the table and write the registers may be included in the chip init file 88A.

The chip init file 88A may also optionally include a code segment to be executed in the corresponding phase. For example, the code segments 134A, 134B, and 134C are shown in FIG. 10 for the early POST phase 110, the middle POST phase 114, and the late POST phase 118, respectively. The code segment may include the code to read the table and write the registers, if desired. The code segment may include code to perform certain "special case" initializations that may require more than a predefined initialization value and register identifier, for example.

In some embodiments, different contents of the chip init file 88A may be used for different BIOS vendors. For example, differences in the operation and/or architecture of the BIOS code from different vendors require different contents for the chip init file 88A. In the illustrated embodiment, the chip init file 88A may support different contents by supplying labels delimiting portions of the chip init file 88A for different BIOS vendors. For example, the label "BIOS1" in FIG. 10 may indicate the start of the portion of the chip init file 88A for a first BIOS vendor. The label "BIOS2" may indicate the end of the portion for the first BIOS vendor and the beginning of a portion for the second BIOS vendor. Content tailored for the second BIOS vendor may follow the "BIOS2" label.

FIG. 10 illustrates a single chip init file 88A. However, in other embodiments, multiple files may be provided. Information may be divided among the files in any convenient fashion. For example, different files may be used for each BIOS vendor, including the register initialization contents tailored to that BIOS vendor. Different files may be used for each phase, with the register initialization contents for each phase in the corresponding file. Any number of files may be used, with the contents divided in any desired fashion.

FIG. 11 is a block diagram of a second embodiment of a chip init file 88A. The chip init file 88B may be similar. Similar to the embodiment of FIG. 10, the embodiment of FIG. 11 includes labels 130A-130F delimiting the sections corresponding to each phase. However, in this embodiment, the chip init file 88A includes a code segment for each POST phase (e.g. segments 136A, 136B, and 136C in FIG. 11). The code segments 136A-136C may perform the register initialization. The embodiment of FIG. 11 may be used, e.g., if hooks are provided in the blocks 112, 116, and 120 shown in FIGS. 7-9 for inserting code segments. The code segments 136A-136C may be coded in source code, or may be binary code, as desired. If the code segments 136A-136C are source code, they may be incorporated into the source code of the POST phases 110, 114, and 118, respectively (at the blocks 112, 116, and 120, respectively). The combined source code may then be compiled. Alternatively, if the code segments 136A-136C are binary code, the binary code may be incorporated into the compiled BIOS code 92.

The code segments 136A-136C may provide flexibility in performing the register initializations in any desired fashion. The code segments 136A-136C may include embedded data tables (e.g. similar to the tables shown in FIG. 10), and may include any other desired code to perform the initialization. Similar to the embodiment of FIG. 10, the embodiment of FIG. 11 may support differences for different BIOS vendors, and thus the chip init file 88A may include labels for the different BIOS vendors (e.g. "BIOS1", "BIOS2", etc.).

Similar to the discussion above with regard to FIG. 10, the chip init file 88A illustrated in FIG. 11 may be divided into multiple files, as desired.

Figure 12:
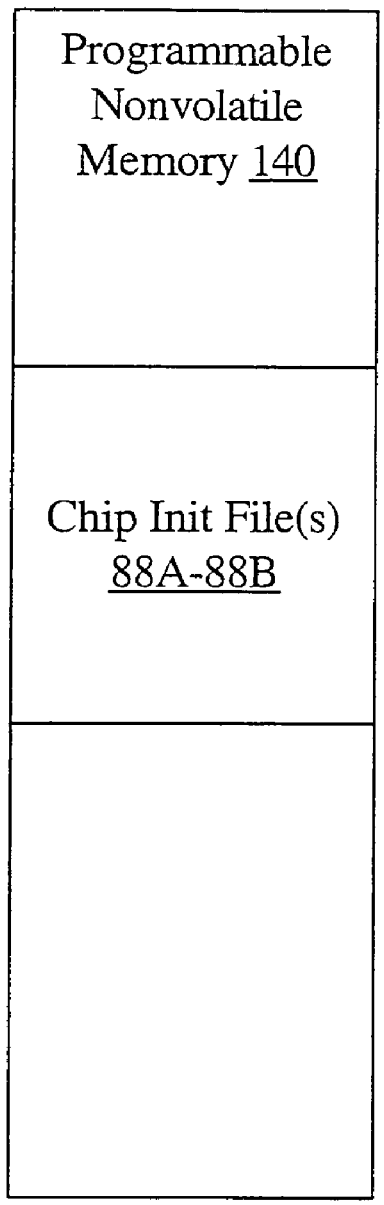
FIG. 12 is a block diagram of one embodiment of a programmable nonvolatile memory storing one or more chip init files.

FIG. 12 is a block diagram of one embodiment of a programmable nonvolatile memory 140 storing one or more chip init files 88A-88B. The programmable nonvolatile memory 140 may be included in the system 96. The programmable nonvolatile memory 140 may also be used to store other information, and thus a section of the programmable nonvolatile memory 140 may be dedicated to store the chip init files 88A-88B. In other embodiments, the entire programmable nonvolatile memory 140 may be dedicated to store the chip init files 88A-88B. While any programmable nonvolatile memory may be used (e.g. any type of PROM), flash memory may be used in one embodiment.

The embodiment of FIG. 12 may be used for embodiments in which the chip init files 88A-88B are accessed during execution by the BIOS code 92. In some embodiments, for example, the chip init files 88A-88B may be similar to the embodiment of FIG. 10. However, instead of labels to differentiate the sections for each POST phase, there may be data at the beginning of each section identifying the section. For example, the data may indicate the size of the section (and thus implicitly the number of entries in the data table and the beginning of the data table for the next phase). If optional code segments are included, the data may also indicate the address of the start of the code segment (e.g. as an offset from the beginning of the section). The code segments may be in binary form for such an embodiment. In other embodiments, the chip init files 88A-88B may be similar to the embodiment of FIG. 11 (with the code segments being in binary form).

For the embodiment of FIG. 12, the blocks 112, 116, and 120 may each comprise hooks pointing to the corresponding code section (or to the data tables, depending on the embodiment).

Figure 13:
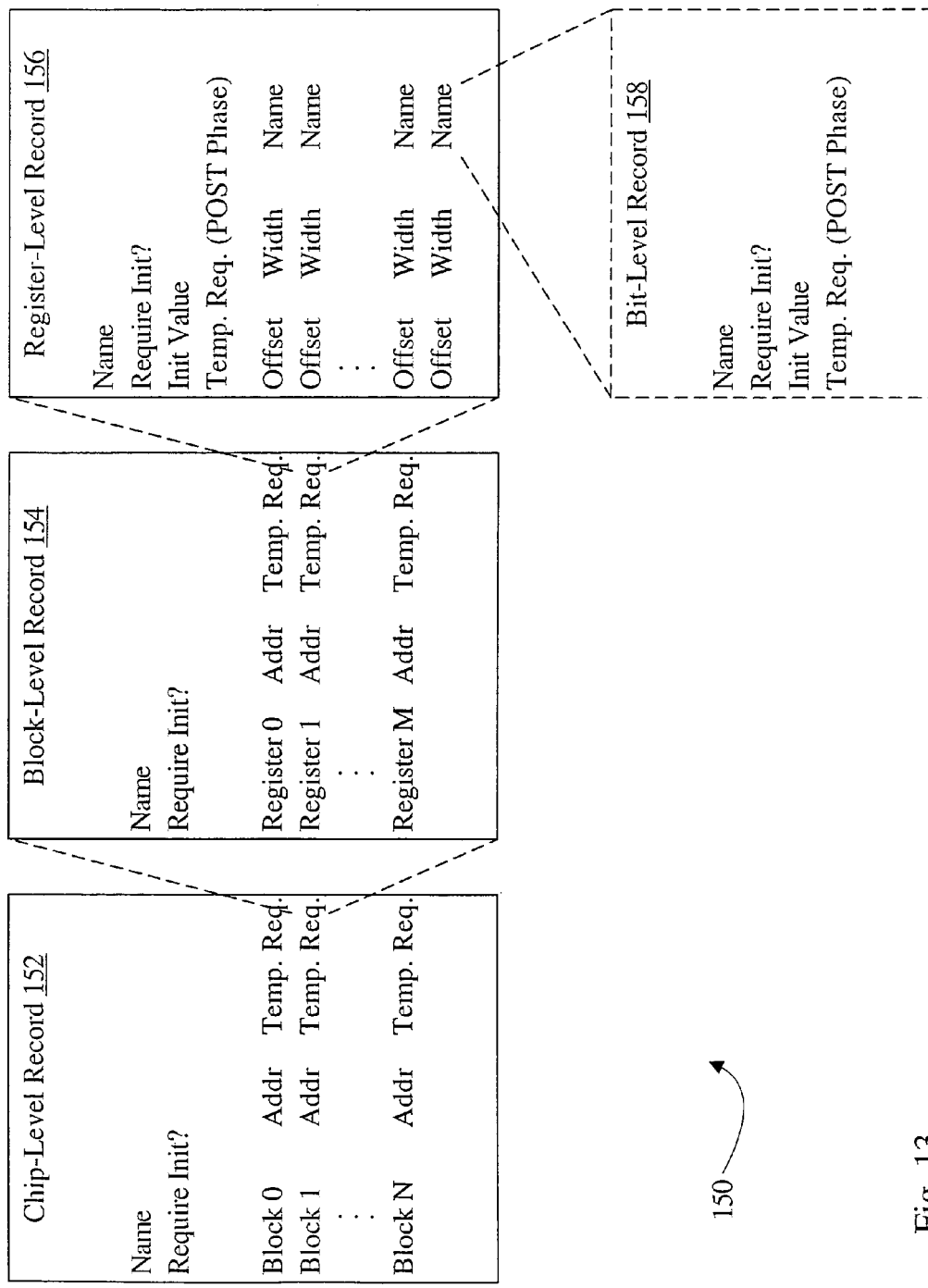
FIG. 13 is a block diagram of one embodiment of a database corresponding to an integrated circuit.

FIG. 13 is a block diagram of one embodiment of a database 150 corresponding to an integrated circuit (chip) (e.g. the chip 78A). The database 150 may be created by the chip vendor 70A, and may store information defining the registers in the chip 78A. Other information may also be included, as desired.

The database 150 includes a chip-level record 152 storing information at the chip level. The chip-level record 152 may include a name field ("Name"), an optional require initialization field ("Require Init?"), and a set of fields for the blocks comprising the chip 78A. The name field may store information identifying the chip 78A (e.g. the name of the chip, the revision level to which the chip level record 152 corresponds, the vendor name, etc.). The require initialization field may be used to indicate whether or not the chip 78A requires initialization by the BIOS code 92. The require initialization field may be used by the code that parses the database 150 to speed parsing, since a record indicating that no initialization is needed may be used to stop parsing that record, and any records linked to the record (e.g. any block-level records, in this embodiment). It is noted that, in some embodiments, a chip 78A may not be divided into blocks. In such embodiments, the block-level records may be eliminated and the chip-level record may include register fields directly.

Generally, a chip may be divided into a plurality of fairly independent blocks. The blocks may interact, but for the most part may operate independently of each other. Each block implements a defined function or function in the chip 78A. For example, a chipset chip may include a power management block and various interface controller blocks (e.g. a PCI controller block, one or more universal serial bus (USB) controller blocks, one or more intelligent device electronics (IDE) controller blocks, etc.). A processor chip may include a decode block, and execute block, a cache block, a bus interface block, etc.

Each block field in the chip-level record 152 may include a block name subfield (e.g. "Block 0", "Block 1", etc. in FIG. 13), an address subfield ("Addr" in FIG. 13) and an optional temporal requirements subfield ("Temp. Req." in FIG. 13). The block name subfield may include a name of the block. The address subfield may include information for addressing the block, if applicable. For example, in a chipset chip, the blocks may be addressable in PCI fashion (e.g. bus number, device number, function number, and ID). Alternatively, the address subfield may be a value relative to a base address of the chip 78A (i.e. an offset from the base address). The temporal requirements subfield may indicate temporal requirements for initializing the block, if any. For example, the temporal requirements may permit specifying when the initialization of the block is to occur relative to the initialization of other blocks (e.g. before another block, after another block, after one block but before a second block, etc.).

Each block field in the chip-level record 152 may be linked to a block-level record (e.g. Block 1 may be linked to the block-level record 154 in FIG. 13). That is, there may be a block-level record for each block. The block-level record specifies the registers in that block. In the embodiment illustrated in FIG. 13, the block-level record 154 includes a name field ("Name"), a require initialization field ("Require Init?"), and a register field for each register in the block. The name field may include the name of the block, as well as any other desired information (e.g. revision level, vendor name, etc.). The require initialization field may be similar to the same field in the chip-level record 152. If the require initialization field indicates that the block requires no initialization, the parser may skip the block (and the register-level and bit-level records linked to the block-level record).

Each register field includes a name subfield (e.g. "Register 0", "Register 1", etc. in FIG. 13), an address subfield ("Addr" in FIG. 13) and an optional temporal requirements subfield ("Temp. Req." in FIG. 13). The address subfield may include information for addressing the register (e.g. PCI-style, an offset from a base address of the block, a special register address, an MSR address, etc.). The temporal requirements subfield may indicate temporal requirements for the register, if applicable. For example, the temporal requirements may permit specifying when the initialization of the register is to occur relative to the initialization of other registers in the block (e.g. before another register, after another register, after one register but before a second register, etc.).

Each register field in the block-level record 154 may be linked to a register-level record (e.g. Register 1 may be linked to the register-level record 156 in FIG. 13). That is, there may be a register-level record for each register. The register-level record specifies the contents of the register (e.g. in terms of bit fields). In the embodiment illustrated in FIG. 13, the register-level record 156 includes a name field ("Name"), a require initialization field ("Require Init?"), an initialization value field ("Init Value"), an optional temporal requirements field ("Temp. Req. (POST Phase)") and a bit-identifier field for each bit field in the register. The name field may include the name of the register, as well as any other desired information (e.g. register size, default value on reset, etc.). The require initialization field may be similar to the same field in the chip-level record 152. If the require initialization field indicates that the register requires no initialization, the parser may skip the register (and the bit-level records linked to the register-level record).

The initialization value field may store the value to which the register is to be initialized by the BIOS code 92. Thus, the parser may read the initialization value field to capture the initialization value to be provided in the chip init file(s) 88A for the register. The temporal requirements field may indicate which POST phase the register is to be initialized in, if applicable (e.g. early POST, middle POST, or late POST). If there are temporal requirements between registers, those requirements may be specified in the block-level record 154 as described above.

Each bit-identifier field includes an offset subfield, a width subfield, and a name subfield. The offset subfield is the bit offset within the register of the first bit of the bit field. The width is the number of bits in the bit field, and the name is the name of the bit filed. Each bit-identifier field may be linked to a bit-level record (e.g. bit-level record 158 in FIG. 13). That is, there may be a bit-level record for each bit field in the register. In the embodiment illustrated in FIG. 13, the bit-level record 158 includes a name field ("Name"), a require initialization field ("Require Init?"), an initialization value field ("Init Value"), and an optional temporal requirements field ("Temp. Req. (POST Phase)"). The name field may include the name of the bit field, as well as any other desired information (e.g. default value on reset, etc.). The require initialization field may be similar to the same field in the chip-level record 152. If the require initialization field indicates that the bit field requires no initialization, the parser may skip the bit-level record 158.

The initialization value field may store the value to which the bit field is to be initialized by the BIOS code 92. Thus, the parser may read the initialization value field to capture the initialization value to be provided in the chip init file(s) 88A for the register. By providing initialization values in both the bit-level and the register-level records, flexibility may be provided in specifying initialization values. A value for the entire register may be specified at the register level or, if only certain bit fields require initialization, those values may be provided at the bit-level. The temporal requirements field may indicate which POST phase the bit field is to be initialized in, if applicable (e.g. early POST, middle POST, or late POST). By providing the temporal requirements field in the bit-level records as well, flexibility may be provided in specifying the temporal requirements. For example, if various bit fields require initialization at different phases, the bit-level temporal requirements fields may be used. If the entire register may be initialized at once, the register-level temporal requirements field may be used.

It is noted that, in some embodiments, the bit-level records may not be needed (e.g. all registers may be initialized as a whole in one phase). In such embodiments, the bit-level records may be eliminated from the database 150.

Figure 14:
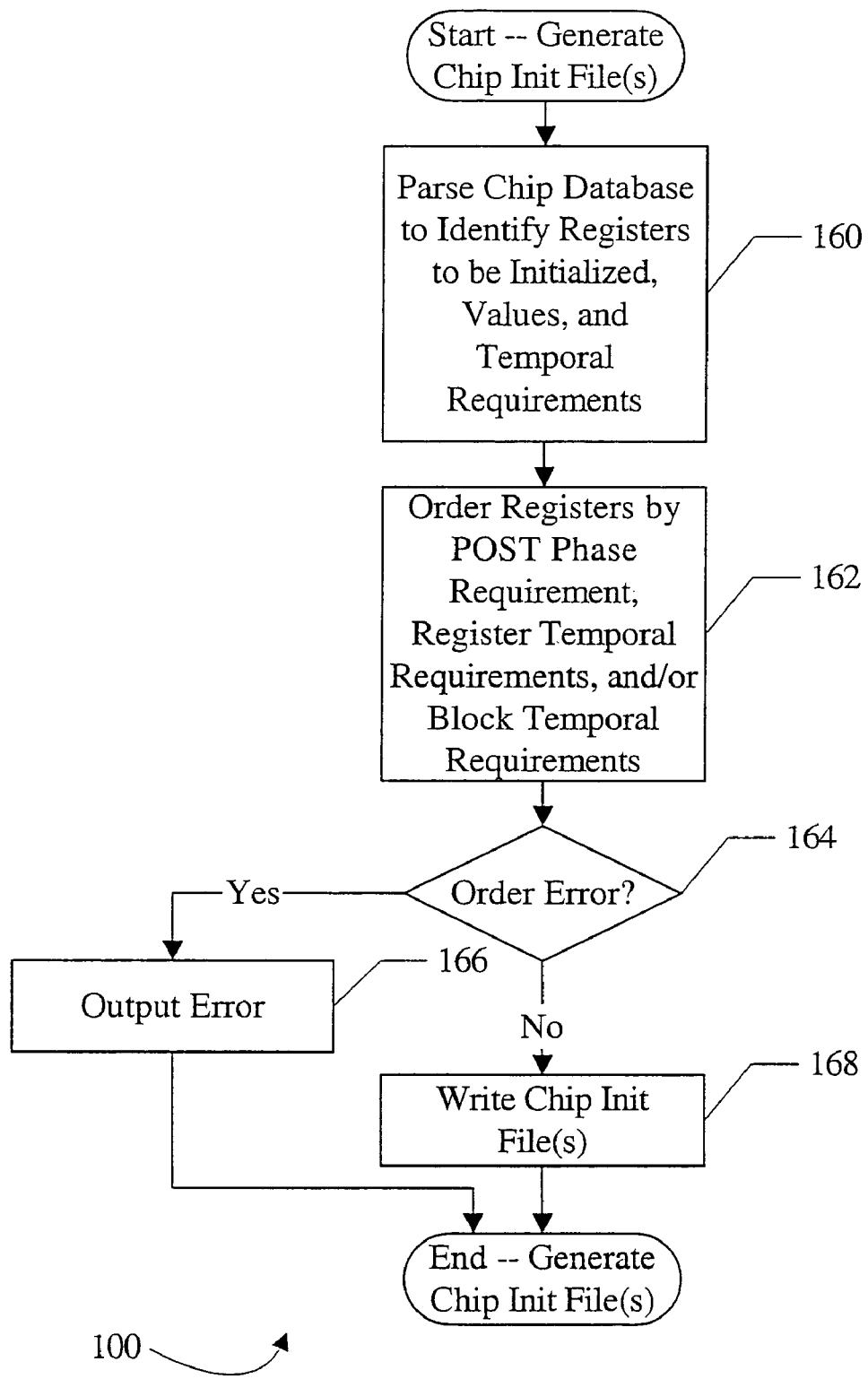
FIG. 14 is a flowchart of one embodiment of generating one or more chip init files using the database of FIG. 13.

Turning next to FIG. 14, a flowchart of one embodiment of generating one or more chip init files using the database of FIG. 13 is shown. That is, the flowchart of FIG. 14 may illustrate block 100 from FIG. 6 in more detail for one embodiment. In some embodiments, the flowchart of FIG. 14 may be implemented in software (e.g. chip init generation code) executed on a computer system at the chip vendor 70A-70B. The blocks may each represent one or more instructions in the software which, when executed, perform the operation(s) specified for those blocks.

The chip init generation code may include a parser to parse the chip database 150 to identify the registers to be initialized, the initialization values, and the temporal requirements, if any of the initializations (block 160). The parser may general begin at the chip-level record 152, and trace down the hierarchy of each block (to its block-level record 152), each register in the block (to its register-level record), and each bit field in the register (to its bit-level record). In embodiments employing the require initialization field, the parser may stop at any level that indicates that no initialization is required. The parser may return to the next-higher level in the hierarchy and select the next field at that level (e.g. if stopped at the register level, the parser may return to the block-level record and select the next register field). The parser may extract the register identifier, the initialization value, and the temporal requirements. It is noted that the same register may be extracted more than once, if the bit field temporal requirements are different for various bit fields in that register.

The chip init generation code may then order the registers according to POST phase requirements, register temporal requirements, and/or block temporal requirements (block 162). The chip init generation code may check to see if there is any error in the temporal requirements (i.e. may detect if not all of the temporal requirements may be met because of conflicts in the requirements) (decision block 164). If an error is detected (decision block 164—"yes" leg), the chip init generation code may output the error (block 166). Otherwise, the chip init generation code may writ the chip init file(s) 88A (block 168).

Figure 15:
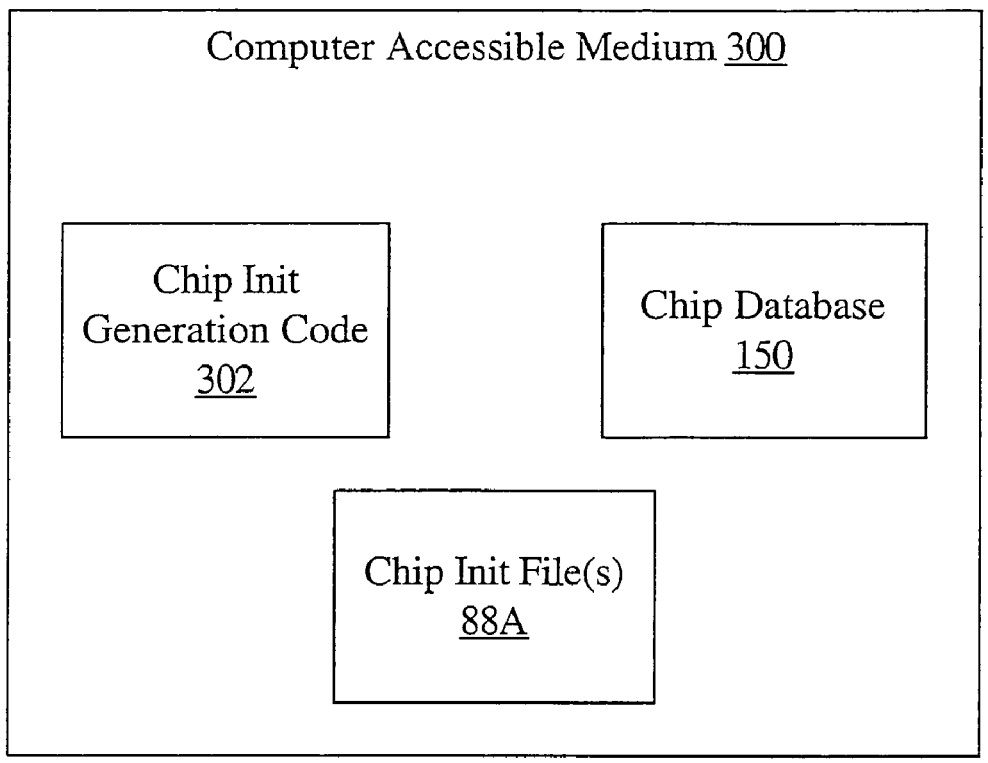
FIG. 15 is a block diagram of a computer accessible medium.

Turning next to FIG. 15, a block diagram of a computer accessible medium 300 is shown. Generally speaking, a computer accessible medium may include any media accessible by a computer. For example, a computer accessible medium may include storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

The computer accessible medium may store the chip init generation code 302 (e.g. code implementing block 100 of FIG. 6, including embodiments which implement the details of FIG. 14, and optionally the block 102 of FIG. 6). The computer accessible medium 300 may also store the chip database 150, and/or the chip init file(s) 88A. Other embodiments may also store the chip init files 88B.

Numerous variations and modifications will become apparent to those skilled in the art once the above disclosure is fully appreciated. It is intended that the following claims be interpreted to embrace all such variations and modifications.

What is claimed is:

1. A method comprising a first vendor generating one or more files corresponding to an integrated circuit designed by the first vendor, the integrated circuit having one or more registers, wherein a content of the one or more files is structured for at least one of: (i) incorporation into a boot code sequence; or (ii) access by the boot code sequence during execution; and wherein the boot code sequence, when executed, initializes the one or more registers of the integrated circuit responsive to the content of the one or more files.

2. The method as recited in claim 1 wherein a change to the one or more files is performed without requiring a recompile of the boot code sequence.

3. The method as recited in claim 1 further comprising the first vendor transmitting the one or more files to a second vendor that develops the boot code sequence.

4. The method as recited in claim 3 wherein the second vendor is one of a plurality of vendors that develop the boot code sequence, and wherein the generating the one or more files comprises providing a plurality of sections in the one or more files, each of the plurality of sections corresponding to a different one of the plurality of vendors.

5. The method as recited in claim 1 further comprising the first vendor transmitting the one or more files to a manufacturer of a system that includes the integrated circuit and the boot code sequence.

6. The method as recited in claim 5 further comprising storing the one or more files in a nonvolatile memory in the system.

7. The method as recited in claim 6 further comprising accessing the one or more files during execution of the boot code sequence in the system.

8. The method as recited in claim 1 wherein the boot code sequence is divided into a plurality of phases, and wherein the one or more files are also divided according to the plurality of phases, and wherein generating the one or more files comprises including a first register of the one or more registers in a first phase of the plurality of phases in which the first register is to be initialized.

9. The method as recited in claim 8 wherein the plurality of phases comprises an early phase, a middle phase subsequent to the early phase, and a late phase subsequent to the middle phase.

10. The method as recited in claim 1 wherein the one or more files comprise at least one table of register identifiers and corresponding initialization values for the one or more registers.

11. The method as recited in claim 10 wherein the one or more files further comprise code which, when executed, initializes at least one register of the one or more registers.

12. The method as recited in claim 1 wherein the one or more files comprise code which, when executed, initializes the one or more registers.

13. The method as recited in claim 12 further comprising incorporating the code from the one or more files into the boot code sequence during a compile of the boot code sequence.

14. The method as recited in claim 1 wherein a database corresponding to the integrated circuit defines the one or more registers and initialization values for the one or more registers, and wherein generating one or more files comprises parsing the database to extract indications of the one or more registers and the initialization values.

15. The method as recited in claim 14 wherein the database further defines temporal ordering requirements for at least some of the one or more registers, and wherein the generating one or more files further comprises ordering the indications of the one or more registers and the initialization values according to the temporal ordering requirements.

16. The method as recited in claim 15 wherein a first temporal ordering requirement corresponding to a first register of the one or more registers identifies a first phase of a plurality of phases of the boot code sequence in which the first register is to be initialized.

17. The method as recited in claim 15 wherein a first temporal ordering requirement corresponding to a first register of the one or more registers identifies a second register of the one or more registers and an order of initializing the first register and the second register.

18. The method as recited in claim 15 wherein the integrated circuit includes a plurality of blocks, each block having a subset of the one or more registers, and wherein a first temporal ordering requirement identifies a first block of the plurality of blocks, a second block of the plurality of blocks, and an order of initializing subsets of registers in the first block and the second block.

19. The method as recited in claim 14 wherein the database further includes at least one initialization indication of whether or not initialization is required, the parsing not extracting a corresponding indication of a first register in response to the initialization indication indicating that initialization of the first register is not required.

20. A computer accessible storage medium comprising a first one or more instructions which, when executed, generate one or more files corresponding to an integrated circuit, the integrated circuit having one or more registers, wherein a content of the one or more files is structured for at least one of: (i) incorporation into a boot code sequence; or (ii) access by the boot code sequence during execution; and wherein the boot code sequence, when executed, initializes the one or more registers of the integrated circuit responsive to the content of the one or more files.

21. The computer accessible storage medium as recited in claim 20 further comprising a second one or more instructions which, when executed, transmit the one or more files to at least one of: (i) a vendor that develops the boot code sequence; or (ii) a manufacturer of a system that includes the integrated circuit and the boot code sequence.

22. The computer accessible storage medium as recited in claim 20 wherein the boot code sequence is divided into a plurality of phases, and wherein the one or more files are also divided according to the plurality of phases, and wherein the first one or more instructions comprise one or more instructions which, when executed, include a first register of the one or more registers in a first phase of the plurality of phases in which the first register is to be initialized.

23. The computer accessible storage medium as recited in claim 22 wherein the plurality of phases comprises an early phase, a middle phase subsequent to the early phase, and a late phase subsequent to the middle phase.

24. The computer accessible storage medium as recited in claim 20 wherein a plurality of vendors develop the boot code sequence, and wherein the first one or more instructions comprise one or more instructions which, when executed, provide a plurality of sections in the one or more files, each of the plurality of sections corresponding to a different one of the plurality of vendors.

25. The computer accessible storage medium as recited in claim 20 wherein the one or more files comprise at least one table of register identifiers and corresponding initialization values for the one or more registers.

26. The computer accessible storage medium as recited in claim 25 wherein the one or more files further comprise code which, when executed, initializes at least one register of the one or more registers.

27. The computer accessible storage medium as recited in claim 20 wherein the one or more files comprise code which, when executed, initializes the one or more registers.

28. The computer accessible storage medium as recited in claim 20 further comprising a database corresponding to the integrated circuit that defines the one or more registers and initialization values for the one or more registers, and wherein the first one or more instructions comprise a third one or more instructions which, when executed, parse the database to extract indications of the one or more registers and the initialization values.

29. The computer accessible storage medium as recited in claim 28 wherein the database further defines temporal ordering requirements for at least some of the one or more registers, and wherein the first one or more instructions further comprise a third one or more instructions which, when executed, order the indications of the one or more registers and the initialization values according to the temporal ordering requirements.

30. The computer accessible storage medium as recited in claim 29 wherein a first temporal ordering requirement corresponding to a first register of the one or more registers identifies a first phase of a plurality of phases of the boot code sequence in which the first register is to be initialized.

31. The computer accessible storage medium as recited in claim 29 wherein a first temporal ordering requirement corresponding to a first register of the one or more registers identifies a second register of the one or more registers and an order of initializing the first register and the second register.

32. The computer accessible storage medium as recited in claim 29 wherein the integrated circuit includes a plurality of blocks, each block having a subset of the one or more registers, and wherein a first temporal ordering requirement identifies a first block of the plurality of blocks, a second block of the plurality of blocks, and an order of initializing subsets of registers in the first block and the second block.

33. The computer accessible storage medium as recited in claim 28 wherein the database further includes at least one initialization indication of whether or not initialization is required, and wherein the third one or more instructions, when executed, do not extract a corresponding indication of a first register in response to the initialization indication indicating that initialization of the first register is not required.

34. A method comprising:
receiving, from a first vendor, one or more files corresponding to an integrated circuit designed by the first vendor, the integrated circuit having one or more registers, wherein a content of the one or more files is structured for at least one of: (i) incorporation into a boot code sequence; or (ii) access by the boot code sequence during execution;
incorporating the content of the one or more files into the boot code sequence; and
executing the boot code sequence to initialize the one or more registers of the integrated circuit responsive to the content of the one or more files.

35. The method as recited in claim 34 wherein the receiving is performed by a second vendor that develops the boot code sequence.

36. The method as recited in claim 35 wherein the second vendor is one of a plurality of vendors that develop the boot code sequence, and wherein the one or more files comprise a plurality of sections, each of the plurality of sections corresponding to a different one of the plurality of vendors.

37. The method as recited in claim 34 wherein the receiving is performed by a manufacturer of a system that includes the boot code sequence and the integrated circuit.

38. The method as recited in claim 37 further comprising storing the one or more files in a nonvolatile memory in the system.

39. The method as recited in claim 38 further comprising accessing the one or more files during execution of the boot code sequence in the system.

40. The method as recited in claim 34 wherein the one or more files comprise at least one table of register identifiers and corresponding initialization values for the one or more registers.

41. The method as recited in claim 40 wherein the one or more files further comprise code which, when executed, initializes at least one register of the one or more registers.

42. The method as recited in claim 34 wherein the one or more files comprise code which, when executed, initializes the one or more registers.

\* \* \* \* \*